(12) United States Patent
Lin et al.

(10) Patent No.: US 6,994,303 B2
(45) Date of Patent: Feb. 7, 2006

(54) RAIL MODULE

(75) Inventors: Chih-Chiang Lin, Taoyuan (TW);
Shih-Chun Huang, Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 19 days.

(21) Appl. No.: 10/870,917

(22) Filed: Jun. 21, 2004

(65) Prior Publication Data
US 2005/0092872 A1 May 5, 2005

(30) Foreign Application Priority Data
Oct. 30, 2003 (TW) .............................. 92130338 A

(51) Int. Cl.
*A47F 5/00* (2006.01)
(52) U.S. Cl. .............................. 248/122.1; 248/125.2; 248/917; 248/919
(58) Field of Classification Search ............. 248/122.1, 248/123.11, 125.2, 125.8, 161, 162.1, 406.2, 248/917, 919, 188.5; 108/136, 144.11, 147.19, 108/146
See application file for complete search history.

(56) References Cited

U.S. PATENT DOCUMENTS

| 6,494,005 | B2 * | 12/2002 | Zimmerman | .................. 52/296 |
| 6,702,238 | B1 * | 3/2004 | Wang | ....................... 248/125.8 |
| 6,712,321 | B1 * | 3/2004 | Su et al. | ................. 248/123.11 |
| 2003/0116684 | A1 * | 6/2003 | Rotondi | .................... 248/125.8 |
| 2004/0113031 | A1 * | 6/2004 | Sung | ........................... 248/146 |

FOREIGN PATENT DOCUMENTS

JP            2004077710 A   *   3/2004

* cited by examiner

*Primary Examiner*—Ramon O Ramirez
(74) *Attorney, Agent, or Firm*—Rabin & Berdo, PC

(57) ABSTRACT

A rail module has a leaf spring, an inner rail, an inner block and an outer housing. A leaf spring has assembly holes in one end thereof. An inner rail is a hollow parallel pipe with three major walls; one end of the inner rail has a chamber for the leaf spring. The chamber has a gap for installing the leaf spring. An inner block has assembly pins to fit into assembly holes. An outer housing is employed to dock with the inner rail and to connect with the inner block. While the rail module operates, a friction force between the inner rail and the inner block plus a load balance a pull force of the leaf spring.

14 Claims, 6 Drawing Sheets

RAIL MODULE

BACKGROUND

1. Field of Invention

The present invention relates to a rail module. More particularly, the present invention relates to a rail module and an assembling method thereof.

2. Description of Related Art

In order to meet various customer demands for information electronics, more products are specialized for specific demands. For instance, an LCD monitor can be installed on a wall by means of a base, which attaches to the wall firmly. Some LCD monitors are placed on a desk by means of a normal base, which supports the LCD Monitor. Moreover, the pedestal of the LCD monitor must allow height adjustment to meet the needs of desks, persons or chairs of different heights.

A conventional LCD monitor has a height-adjustable pedestal. Height adjustment is achieved by means of a spring, and assembling the spring is quite complicated. Besides, the pedestal is made of metal. It is very heavy and costly to produce a metal, height-adjustable pedestal.

SUMMARY

It is therefore an objective of the present invention to provide a rail module so as to save assembly time in manufacturing.

In accordance with the foregoing and other objectives of the present invention, a rail module consists of a leaf spring, an inner rail, an inner block and an outer housing. A leaf spring has one end with assembly holes. An inner rail is a hollow parallel-piped including three major walls; one end of the inner rail has a chamber for the leaf spring. The chamber has a gap for installing the leaf spring. An inner block has assembly pins to fit into assembly holes. An outer housing is employed to dock with the inner rail and to connect with the inner block. While the rail module operates, a friction force between the inner rail and the inner block plus a load balance a pull force of the leaf spring.

In general, the assembly time of manufacturing the rail module can be reduced because of simple structure design. The rail module's weight can be reduced if most parts of the rail module are made from plastic materials. These and other features, aspects, and advantages of the present invention will become better understood with reference to the following description and appended claims.

It is to be understood that both the foregoing general description and the following detailed description are examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
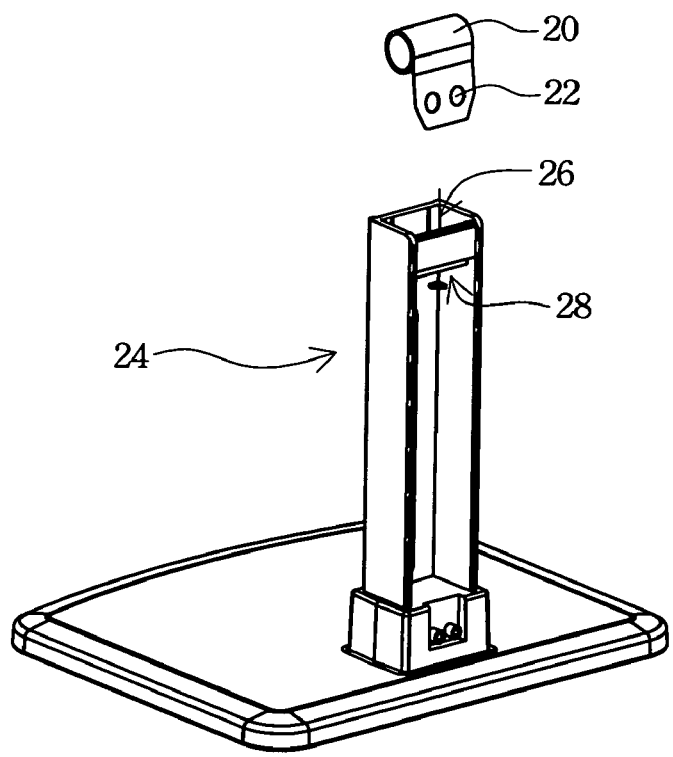
FIG. 1A illustrates a perspective view of a leaf spring and an inner rail before assembly according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

In order to provide a rail module with simple assembly for an LCD monitor base, all elements of the rail module are redesigned to make assembly process easy and simple.

FIG. 1A illustrates a perspective view of a leaf spring and an inner rail before assembly according to one preferred embodiment of this invention. A leaf spring 20 is shaped into a coil. By pulling one end with assembly holes 22, the leaf spring 20 generates a force to withdraw the end with assembly holes 22. The more the leaf spring 20 is pulled, the larger force it generates. An inner rail 24 is a hollow parallel pipe including three major walls. One end of the inner rail 24 has a chamber 26 for the leaf spring 20, wherein the chamber 26 has a gap 28 for installing the leaf spring 20. The assembly process of present invention is quite simple, and it doesn't need a hinge to fix the leaf spring 20.

Figure 1B:
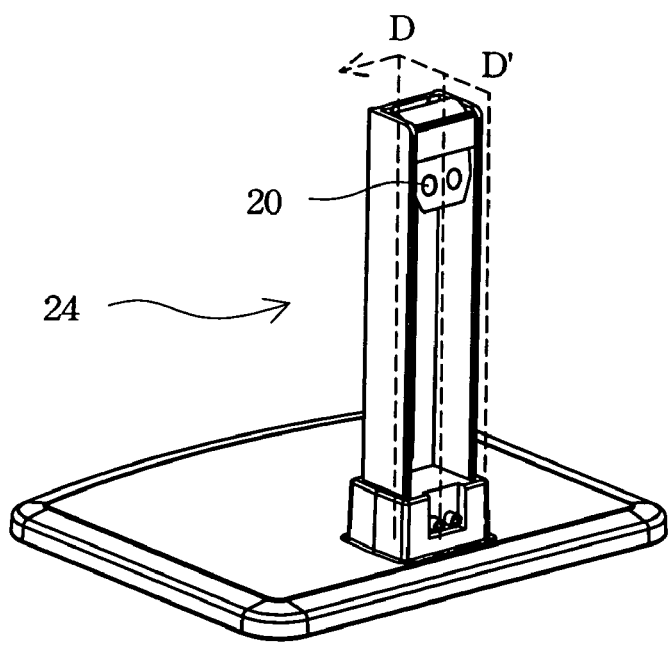
FIG. 1B illustrates a perspective view of a leaf spring and an inner rail after assembly according to one preferred embodiment of this invention.
Figure 1C:
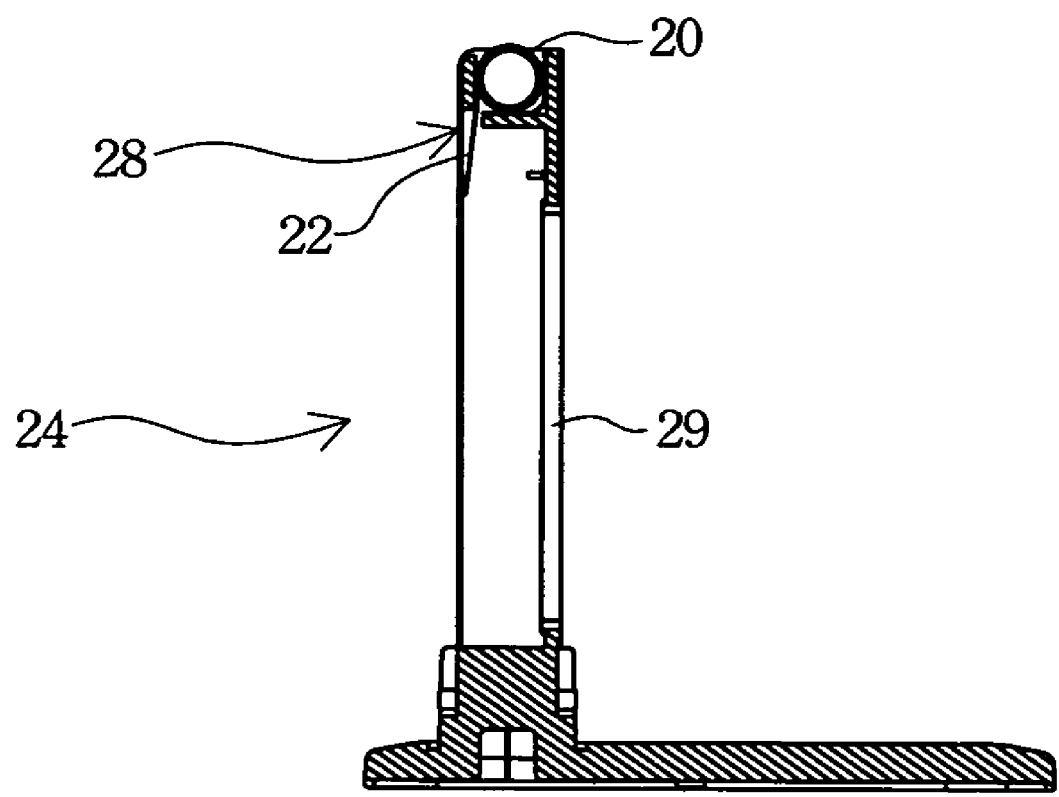
FIG. 1C illustrates a cross-sectional view of a leaf spring and an inner rail after assembly according to one preferred embodiment of this invention.

FIG. 1B illustrates a perspective view of the leaf spring 20 and the inner rail 24 after assembly corresponding to FIG. 1A. One end of the leaf spring 20 is lead through the gap 28 of the chamber 26. FIG. 1C illustrates a cross-sectional view of the leaf spring 20 and the inner rail 24 after assembly corresponding to FIG. 1B. FIG. 1C is taken from a cross-section along line D–D' in FIG. 1B.

Figure 2A:
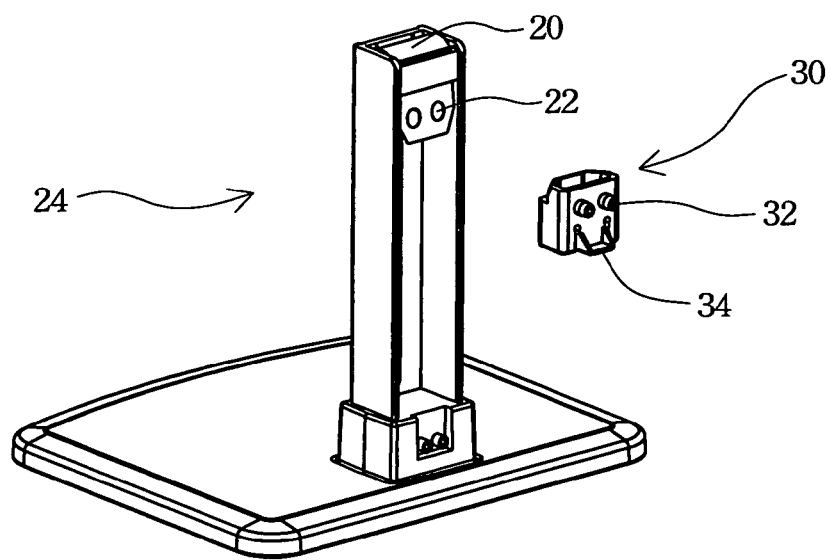
FIGS. 2A and 2B illustrate a perspective view of a leaf spring, an inner rail and an inner block before assembly according to one preferred embodiment of this invention.
Figure 2B:
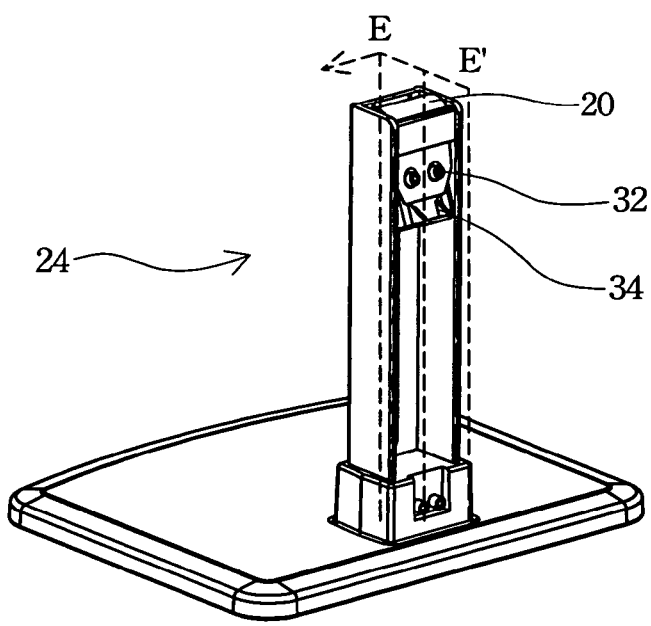

FIGS. 2A and 2B illustrates a perspective view of a leaf spring, an inner rail and an inner block before assembly according to one preferred embodiment of this invention. In FIG. 2A, an inner block 30 includes two assembly pins 32 and a clamp 34. Two assembly pins 32 are employed to fit into the assembly holes 22 of the leaf spring 20. Number of the assembly pins 32 and assembly holes 22 is not limited in 2, and the shapes thereof are not limited to circular pins or circular holes. FIG. 2B illustrates a perspective view of the leaf spring 20 and the inner block 30 after assembly.

Figure 2C:
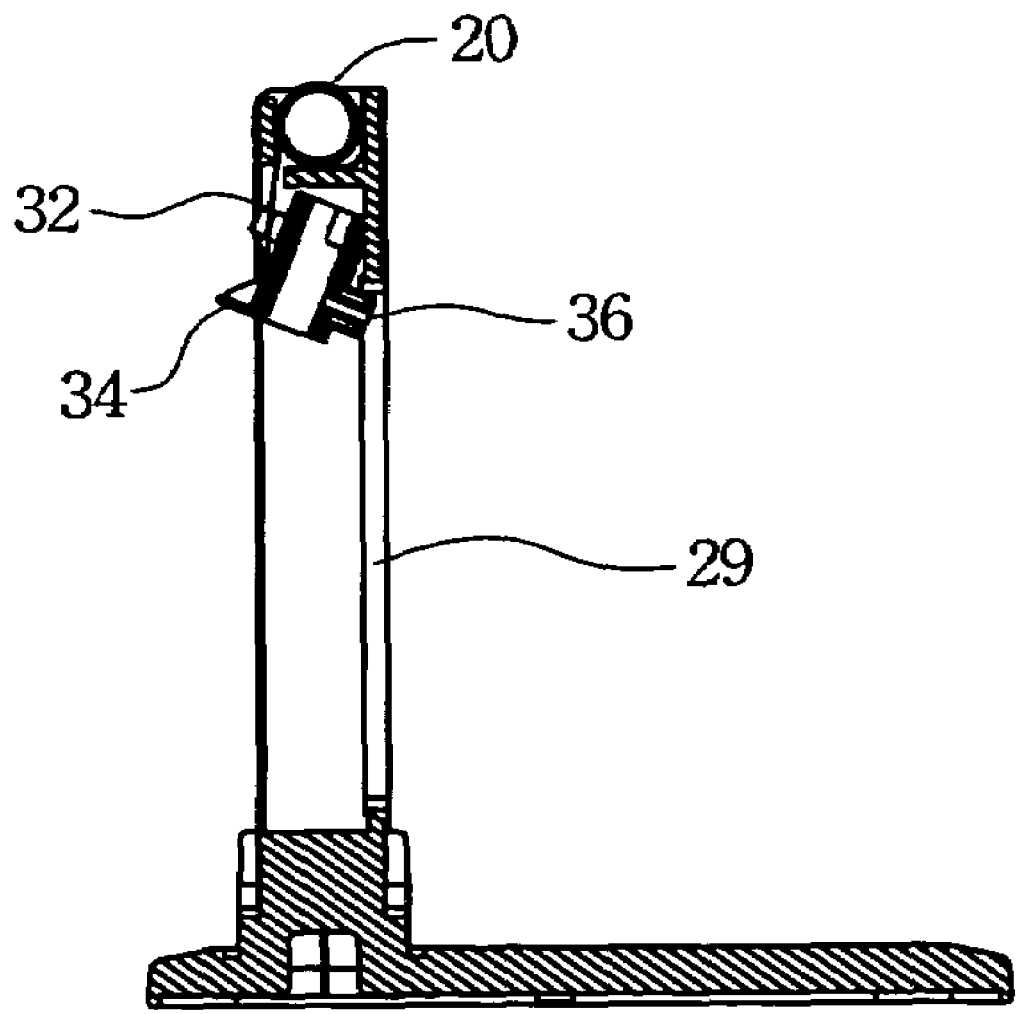
FIG. 2C illustrates a perspective view of a leaf spring, an inner rail and an inner block after assembly according to one preferred embodiment of this invention.

FIG. 2C is a cross section taken along line E–E' in FIG. 2B. The assembly pins 32 of the inner block 30 fit into the assembly holes 22 of the leaf spring 20. Moreover, the raised part 36 of the inner block 30 fits into a slot 29 of the inner rail 24. The assembly pins 32, the clamp 30, and the raised part 36 are protrusion structures formed on the inner block 3.

Figure 3A:
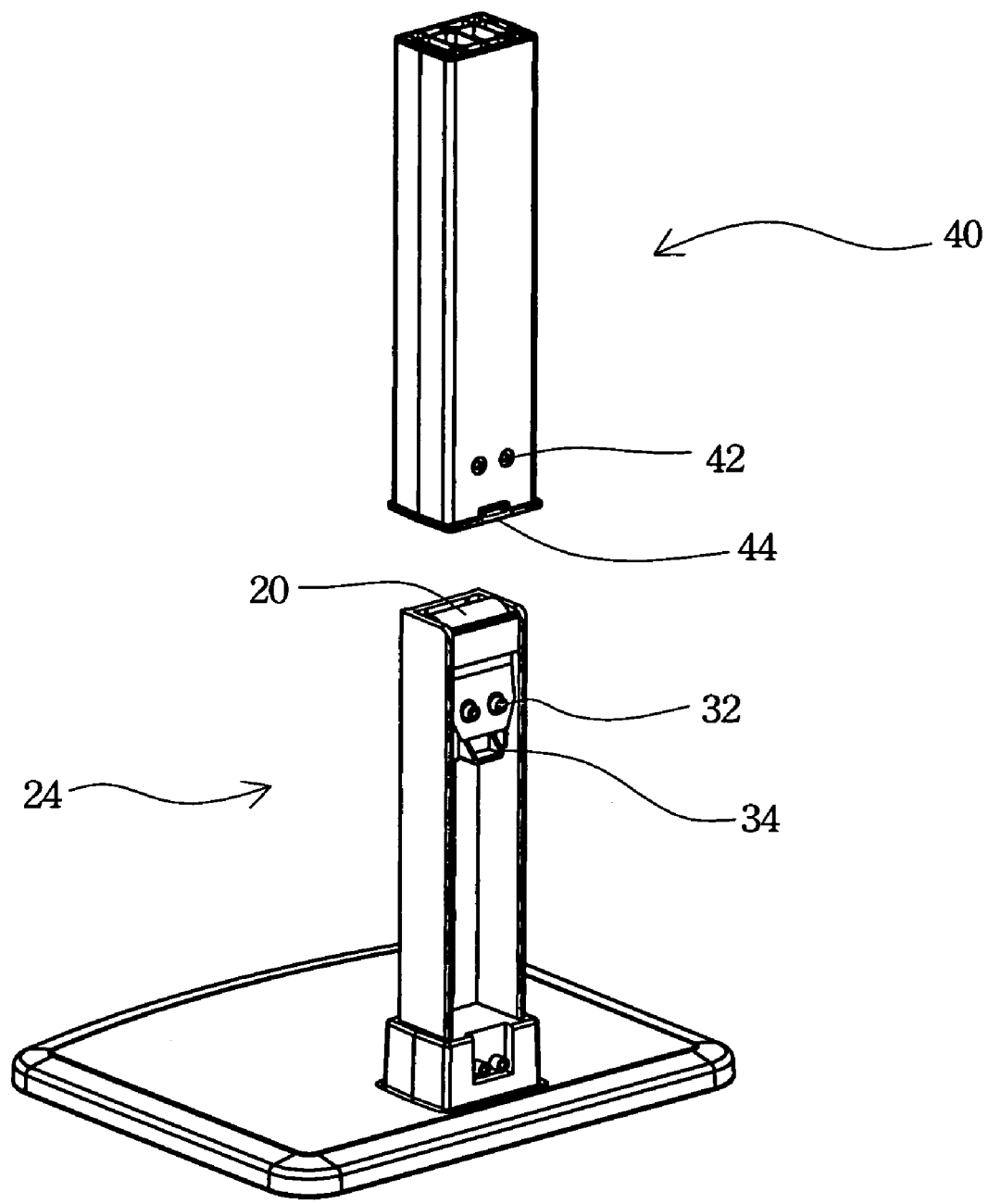
FIG. 3A illustrates a perspective view of rail module before assembly according to one preferred embodiment of this invention.
Figure 3B:
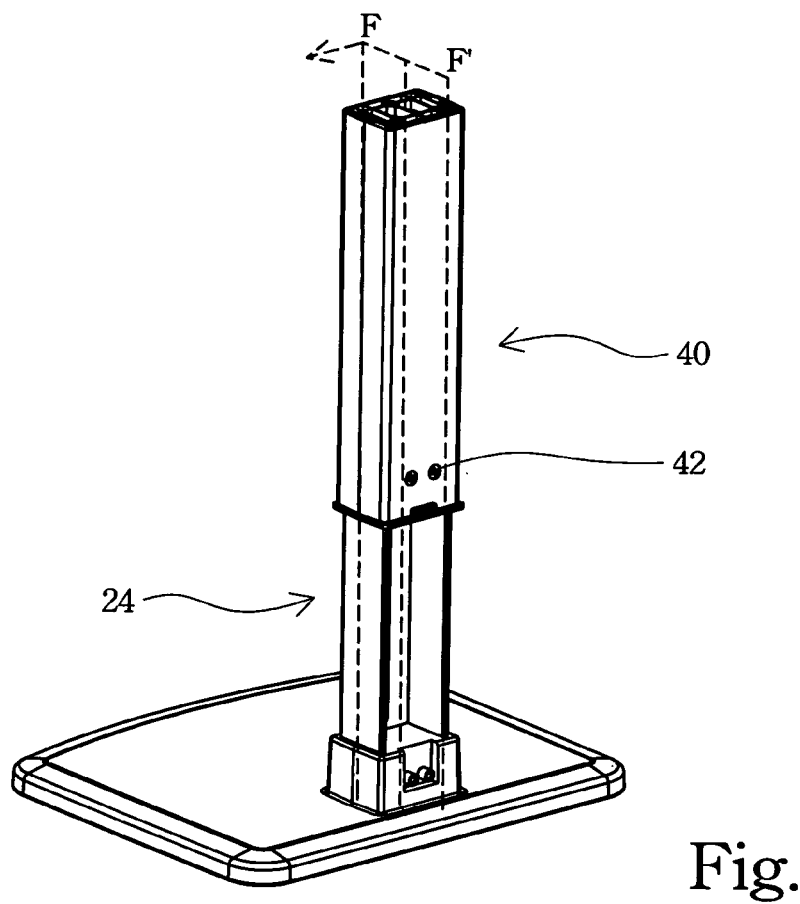
FIG. 3B illustrates a perspective view of rail module after assembly according to one preferred embodiment of this invention.

FIGS. 3A and 3B illustrate a perspective view of rail module before assembly according to one preferred embodiment of this invention. An outer housing 40 is to be docked with the inner rail 24. When the inner rail 24 dock into the housing 40, slot 44 fits into the clamp 34 so as to enable inner rail 24 to move simultaneously with the outer housing 40, upward and downward. In order to secure outer housing 40 to the inner rail 24, predetermined screw holes 42 are designed for assembly. The assembly pins 32 is connected with outer housing 40 by means of screw holes 42.

Figure 3C:
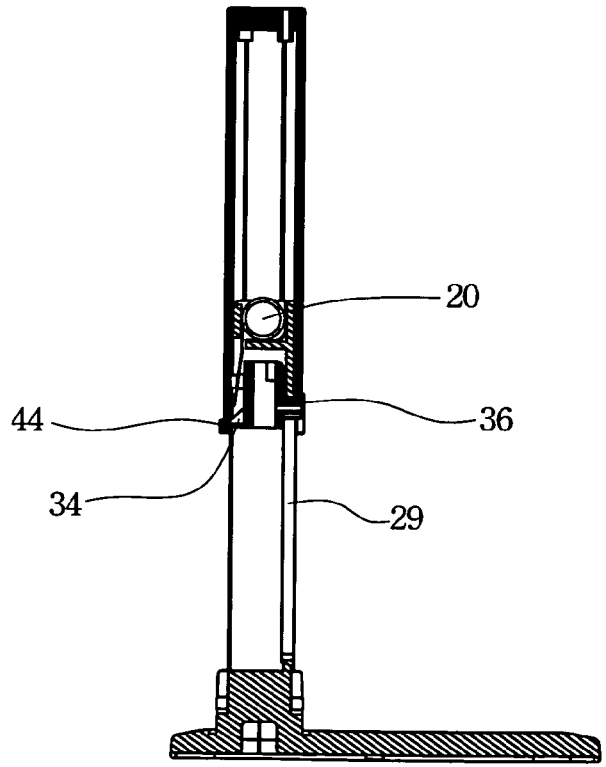
FIG. 3C illustrates a cross-sectional view of a rail module after assembly according to one preferred embodiment of this invention.

FIG. 3C illustrates a cross-sectional view of a rail module after assembly according to one preferred embodiment of this invention. FIG. 3C is a cross section taken along line F–F' in FIG. 3B. While the rail module operates, a friction force between the inner rail 24 and the inner block 30 plus a load (such as a LCD monitor) balance a pull force of the leaf spring 20. Therefore, outer housing 40 can be moved by external force and stopped at any point of the inner rail 24.

All elements of the rail module mentioned above can be made of plastic materials except the leaf spring 20. If most parts of the rail module are made from plastic materials, the rail module's weight can be reduced. However, the materials of the rail module are not limited to plastic materials.

According to one preferred embodiments of present invention, the assembly time of manufacturing the rail module can be reduced because of the simple structural design thereof. The rail module's weight can be reduced if most parts of the rail module are made from plastic materials.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A rail module, comprising:
   a leaf spring having at least one assembly hole on one of its ends;
   an inner rail defined by three major walls forming a hollow parallel pipe, an end of said inner rail having a chamber receiving said leaf spring, said chamber having a gap, the leaf spring being installed in said gap;
   an inner block having at least one assembly pin fitting into said at least one assembly hole; and
   an outer housing secured to said inner block and being telescopically attached with said inner rail;
   wherein a friction force between said inner rail and said inner block plus a load, balance a pull force of said leaf spring.

2. The rail module of claim 1, wherein said leaf spring is shaped as a coil.

3. The rail module of claim 2, wherein said inner block is connected to said leaf spring by means of the at least one assembly pin being received into the at least one assembly hole.

4. The rail module of claim 3, wherein said inner block is made of plastic materials.

5. The rail module of claim 4, wherein said inner rail is made of plastic materials.

6. The rail module of claim 5, wherein said outer housing is made of plastic materials.

7. The rail module of claim 6, wherein said inner block further comprises a raised part.

8. The rail module of claim 7, wherein said inner rail further comprises a slot to fit in said raised part.

9. An assembly method for the rail module of claim 1, said assembly method comprising:
   leading one end of said leaf spring through said gap of said chamber, said leaf spring being fixed without hinge;
   connecting said leaf spring to said inner block; and
   connecting said outer housing to said inner block.

10. The assembly method of claim 9, wherein said leaf spring is shaped as a coil.

11. The assembly method of claim 9, wherein said inner block is connected to the leaf spring by means of the least one assembly pin being received into the at least one assembly hole.

12. The assembly method of claim 9, wherein said inner block is made of plastic materials.

13. The assembly method of claim 9, wherein said inner rail is made of plastic materials.

14. The assembly method of claim 9, wherein said outer housing is made of plastic materials.

* * * * *